Oct. 16, 1951
W. B. MILLIGAN
2,571,470
CONTINUOUS DETERMINATION OF
FLUID MIXTURE COMPOSITIONS
Filed April 17, 1948
2 Sheets-Sheet 2
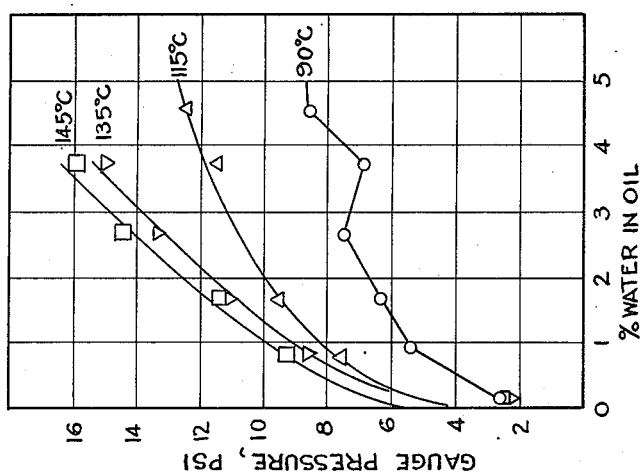
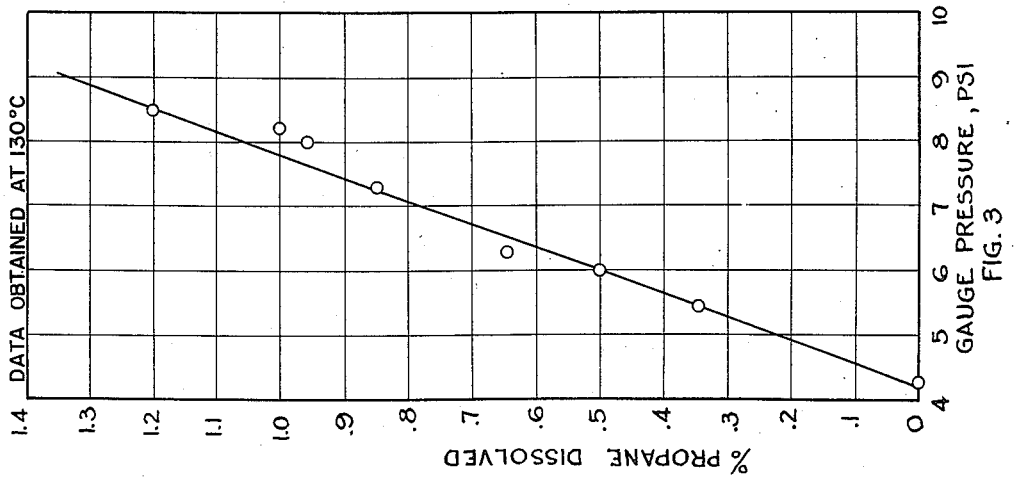
INVENTOR:
WILLIAM B. MILLIGAN
BY Oswald H. Milmore
HIS ATTORNEY Patented Oct. 16, 1951

2,571,470

UNITED STATES PATENT OFFICE 2,571,470

CONTINUOUS DETERMINATION OF FLUID MIXTURE COMPOSITIONS

William B. Milligan, Albany, Calif., assignor to Shell Development Company, San Francisco, Calif., a corporation of Delaware Application April 17, 1948, Serial No. 21,676

4 Claims. (Cl. 73—53)

This invention relates to a method and apparatus for the continuous determination of the composition of a fluid mixture. More particularly, the invention is concerned with the determination of volatile constituents of liquid or liquefiable solutions or dispersions.

The determination of the proportion of volatile constituents in a flow stream is a frequently encountered requirement in many industrial processes. For example, when crude oil is fed into a distillation column, it is important to know when the stream contains more than a limiting amount of water if sudden pressure increases in the column are to be avoided. Small quantities of water, up to several percent, are often dissolved in the crude oil and cannot be detected by noting the appearance of the oil. Again, the water may be emulsified and quantitative determination by settling or centrifuging may be difficult. It also is often desirable to have a rapid and simple device and method for estimating the proportion of volatile constituents of liquids which are miscible with such liquid; an example is the determination of propane in a normally liquid oil.

It is already known to detect the presence of and to estimate the quantity of various volatile constituents in liquids by measurement of vapor pressure or electrical characteristics. Thus the estimation of water of a crude oil has been effected by measurement of its dielectric properties. Such methods, however, require delicate and often complicated equipment and present special problems.

According to one prior proposal, the proportion of air in oil is determined by measuring the discharge pressure at which a positive displacement pump, operated at a constant speed, delivers a stream of oil. (See U. S. Patent No. 2,406,179.) Such a method is not generally suitable for measuring the content of volatile constituents which are normally liquid or the solubility of which in the liquid changes appreciably with temperature at convenient operating temperatures.

It is an object of this invention to provide a convenient and rapid method for continuously determining the proportion of such volatile constituents in a liquid which is relatively non-volatile, and an apparatus for practicing such method.

More particularly, it is an object to provide an improved method and apparatus for indicating the approximate content of water in oil, or of propane, ethane, or similar constituents in oil.

Briefly, according to the instant invention, the liquid, or a sample stream thereof, is flowed at a constant mass rate (preferably by a positive displacement pump, such as a gear pump or plunger displacement pump, or through a liquid metering device) at a constant temperature through a fixed flow restriction, such as an orifice plate or a constricted pipe or tubing of any type, and the pressure drop across the flow resistance is measured. The temperature may be regulated either before or after metering. Temperature regulation is best effected after passing through the metering pump, but may in some instances be effected prior thereto if special precautions are taken to avoid a change in the mass rate of flow due to vaporization of the volatile constituent. The temperature should be at least high enough to cause the volatile constituent to have a vapor pressure substantially equal to, i. e., more than 70% of, the pressure of the liquid entering the flow resistance. Thus, for the determination of water in oil at near atmospheric pressures on the upstream side of the flow resistance, the temperature should be above about 90° C., at which the water has a vapor pressure substantially equal to one atmosphere; better results are obtained by operating at somewhat higher temperatures, at which the volatile constituent has a vapor pressure fully equal to the prevailing pressure, i. e., above 100° C. and, preferably above 110° C. in the determination of water in oil as stated above. The temperature should however, not be so high as to cause appreciable vaporization of the non-volatile constituent of the stream. When the volatile constituent is soluble in the liquid the vapor pressure exerted thereby depends both on its vapor pressure in the pure state and on its concentration, and the above limitations are also applicable; it should, in this case, be understood that the minimum temperature has reference to any selected minimum concentration of the volatile constituent which it is desired to detect. For example, if concentrations greater than 1% of a soluble volatile constituent are to be determined, the minimum temperature is that at which a 1% solution thereof has the above stated vapor pressure.

It was found that the drop of pressure across the fixed flow resistance is a function of the velocity of flow through the resistance. When the mass rate of flow of the liquid is maintained constant the pressure drop will increase with increasing proportions of the volatile constituent.

The invention will be better understood by reference to the accompanying drawing forming a part of this specification and illustrating one preferred embodiment of the apparatus, and flow characteristic curves, wherein:

Figs. 2 and 3 are charts indicating graphically the relation between the content of the volatile constituent and the pressure drop.

Figure 1:
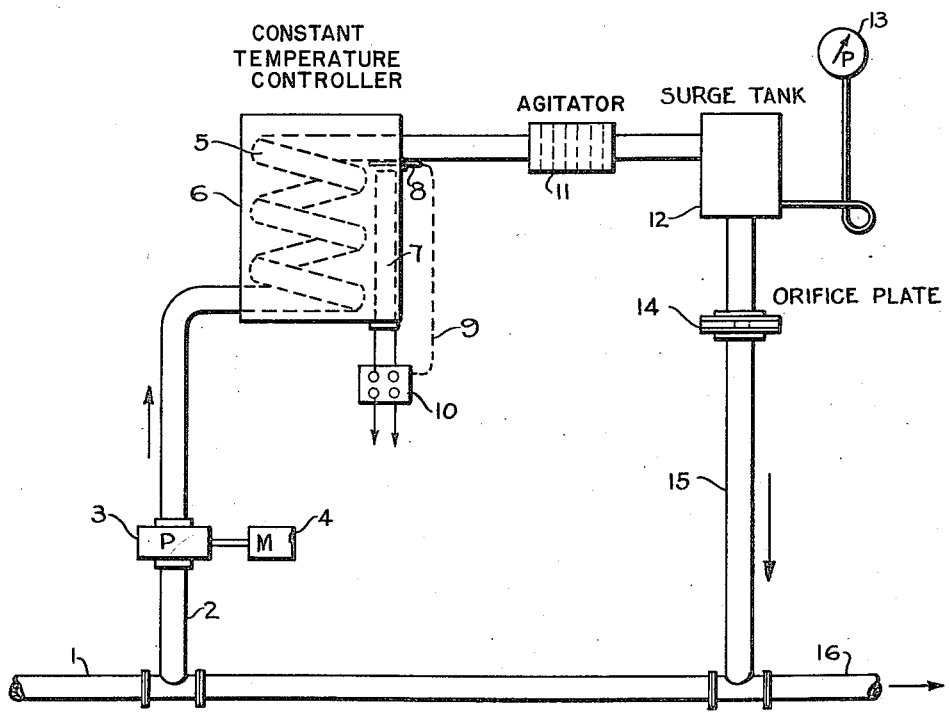
Fig. 1 is a schematic flow diagram of the apparatus.

Referring to Fig. 1, 1 represents a pipe carrying a stream of liquid, such as crude oil, at a temperature and pressure at which only liquid is present. A test stream is taken off through conduit 2 and pumped at a constant rate by a positive displacement pump, such as a gear pump 3 driven at a constant rate by a constant speed motor 4, through a heating coil 5 within heat exchanger or constant temperature controller 6. The heat exchanger may be of any type, such as a steel coil embedded in an aluminum block heater as indicated, and provided with an electric heating element 7. A constant temperature is maintained by an automatic thermostatic control comprising a temperature responsive element 8 near the outlet connected by control line 9 to a control switch 10. A filter or agitator 11 is optionally interposed in the line to homogenize the liquid, which then passes through a surge tank 12 provided near the bottom with a pressure gage 13. Liquid is discharged from the surge tank through a flow resistance, such as an orifice plate 14. The liquid then flows through conduit 15 into the main flow pipe 16. If desired, a cooler may be interposed in the line 15.

In the apparatus described, the pressure in the flow line 16 is assumed to be constant, e. g., near atmospheric, so that the indication on the pressure gage 13 will show a pressure is substantially equivalent to the pressure drop across the flow resistance 14, 1. e., the pressure difference between the opposite sides of the orifice plate. In installations wherein the pressure in the outlet to the line 15 is not constant it is, of course, necessary to provide a differential pressure gage across the orifice plate; such a gage being well known per se, it is thought to be unnecessary to show one in the drawing. The arrangement illustrated is, moreover, the preferred embodiment because the method operates best when the discharge pressure of the flow resistance is maintained reasonably constant.

The temperature of the liquid flowing through the orifice plate 14 is maintained constant at a value at which the volatile constituent exerts an appreciable vapor pressure, preferably almost equal to or in excess of the total pressure on the upstream side of the orifice plate. Under these conditions the reading on the gage 13 will indicate the proportion of the volatile constituent in the liquid.

The surge tank 12 may in certain cases be omitted, particularly when a very even rate of flow is maintained by the pump. It was, however, found in most instances that without the surge tank the needle on the gage 13 vibrated to an extent which made it impossible to estimate the average or to determine the maximum pressure. Instead of a surge tank I may, of course, use a gas chamber or any connected chamber which will act as a cushion to even out pressure variations.

*Example I*

A white oil was mixed with a small amount of emulsifying agent (Aresol O. T.), and different amounts of water intimately mixed with the oil in different runs, as indicated below. The oil-and-water dispersions were heated to the temperatures indicated and pumped at constant rates of 140 ml. per minute through orifice plates having orifice diameters of 0.025 inch. The discharge pressure was atmospheric, and the pressure on the upstream side of the orifice was measured for each run. The results are plotted on the chart in Fig. 2. This chart shows usable but somewhat erratic results for the runs at 90° C. and more reproducible results at the higher temperatures.

It will be noted that for any given temperature there is a marked correlation between the pressure and the water content of the oil, and that the temperature of the oil significantly influences the pressure.

*Example II*

The work described in Example I was repeated, at a single temperature (135° C.) using propane instead of water, and eliminating the emulsifying agent. The results are plotted in Fig. 3, from which it is seen that a reasonable indication of the propane content of the oil can be obtained by this method.

Although the instant method is particularly applicable to flowing liquids through the flow resistance, it should be noted that it is not limited to normally liquid substances, it being possible to liquefy normally highly viscous or solid substances by heating and to condense gaseous substances by cooling. Thus, the heat exchanger 6 may be operated as a cooling unit if the feed stream is at a temperature at which the less volatile constituent has too high a vapor pressure.

As indicated above, the temperature regulation is best effected after the solution or mixture to be tested has been passed through the metering pump because pumping at a temperature at which the volatile constituent is partially vaporized results in a variable mass rate of flow depending upon the composition of the feed, it being noted that most metering pumps are constructed to maintain the volume rate of fluid constant. The invention is not, however, in every case limited to temperature regulation following the metering but may be used in a system wherein the stream is metered at the regulated or at a higher temperature provided that metering means are provided which are not affected by the presence of vapor, or when the pressure at the pump is maintained sufficiently high to prevent vaporization. In the latter case the metered, high pressure stream is passed through a pressure-reducing unit, such as an orifice with a pressure regulator for maintaining a constant pressure drop across the orifice, before being passed into the surge tank and the constant flow resistance. Further, instead of a pump, any automatic flow controller may be employed. However, I regard the embodiment illustrated in the drawing as the most practical manner of using the invention.

In the foregoing description, the minimum temperature was defined with reference to the relation between the vapor pressure of the volatile constituent and the pressure on the stream entering the constant flow resistance. The latter pressure is, in the case in which the outlet pressure is constant, dependent upon the concentration of the volatile constituent; in such case the definition, as used in the specification and claims, has reference to the pressure prevailing at the intake to the orifice when the stream is free from the volatile constituent.

I claim as my invention:

1. A method for continuously determining the proportion of a volatile constituent of a mixture of liquids which comprises flowing a stream of said liquids at a constant mass rate and at a constant temperature and through a constant flow resistance, and measuring the pressure difference between opposite sides of said resistance to obtain an indication of the proportion of said volatile constituent, said temperature being at least sufficiently high to cause the vapor pressure of said volatile material to be substantially equal to the pressure on the liquid stream entering said resistance.

2. A method of continuously determining the proportion of water in hydrocarbon oil which comprises flowing a stream of said oil at a constant temperature and at a constant mass rate through a constant flow resistance, and measuring the pressure difference between opposite sides of said resistance to obtain an indication of the proportion of water in the oil, said temperature being sufficiently high to cause the water vapor pressure to be at least 70% of the pressure on the stream entering said resistance.

3. A method of continuously determining the proportion of water in hydrocarbon oil which comprises metering said oil to produce a stream having a constant mass rate, bringing said stream to a constant temperature, flowing the stream through a constant flow resistance, and measuring the pressure difference between opposite sides of said resistance to obtain an indication of the proportion of water in the oil, said temperature being sufficiently high to cause the water vapor pressure to be at least fully equal to the pressure on the stream entering said resistance.

4. Apparatus for continuously determining the proportion of a volatile constituent of a mixture of liquids comprising, in combination, a positive-displacement pump, means for operating said pump at a constant speed, temperature regulating means for bringing liquids pumped by said pump to a constant temperature, a fixed flow resistance connected to the outlet of said pump, a surge chamber connected between said pump and said flow resistance, and gage means for indicating the pressure difference between opposite sides of said resistance, said difference being greater as the proportion of said volatile constituent increases.

WILLIAM B. MILLIGAN.

REFERENCES CITED

The following references are of record in the file of this patent:

UNITED STATES PATENTS

| Number | Name | Date |
| --- | --- | --- |
| 2,406,179 | Walsh et al. | Aug. 20, 1946 |

FOREIGN PATENTS

| Number | Country | Date |
| --- | --- | --- |
| 257,352 | England | Sept. 2, 1926 |
| 456,836 | England | Aug. 13, 1935 |